(12) United States Patent
Summers et al.

(10) Patent No.: US 8,999,480 B2
(45) Date of Patent: *Apr. 7, 2015

(54) CHIRAL HONEYCOMB MESO-STRUCTURES FOR SHEAR FLEXURE

(75) Inventors: Joshua D. Summers, Clemson, SC (US); Avinash Kolla, Clemson, SC (US); Jaehyung Ju, Sungnam (KR); John Ziegert, Charlotte, NC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 891 days.

This patent is subject to a terminal disclaimer.

(21) Appl. No.: 13/077,202

(22) Filed: Mar. 31, 2011

(65) Prior Publication Data

US 2011/0240194 A1 Oct. 6, 2011

Related U.S. Application Data

(60) Provisional application No. 61/319,915, filed on Apr. 1, 2010.

(51) Int. Cl.
| | |
|---|---|
| *B32B 3/12* | (2006.01) |
| *B60C 7/00* | (2006.01) |
| *B60C 7/10* | (2006.01) |
| *B60C 9/18* | (2006.01) |

(52) U.S. Cl.
CPC ... *B60C 9/18* (2013.01); *B32B 3/12* (2013.01); *B60C 7/10* (2013.01); *B32B 2605/18* (2013.01)

(58) Field of Classification Search
USPC ........... 428/116; 152/246, 323, 329, 251, 310
See application file for complete search history.

(56) References Cited

U.S. PATENT DOCUMENTS

| | | | | |
|---|---|---|---|---|
| 1,440,974 | A | | 1/1923 | Dornburgh |
| 2,815,795 | A | * | 12/1957 | Vander Poel .................. 428/116 |
| 8,609,220 | B2 | * | 12/2013 | Summers et al. ............. 428/116 |

FOREIGN PATENT DOCUMENTS

GB 2463446 A * 3/2010

OTHER PUBLICATIONS

Design of Chiral Honeycomb Meso-Structures for High Shear Flexure; IDETC/CIE Conference; Aug. 13-16, 2010; Montreal, Quebec, Canada.
Sigmund, O., (2008), "Systematic Design of Metamaterials by Topology Optimization," in IUTAM Symposium on Modeling Nanomaterials and Nanosystems, Aalborg, Denmark. pp. 151-159.
Gibson, L. J. and Ashby, M. F., (1997), Cellular Solids Structure and Properties, 2nd ed. Cambridge, UK: Cambridge University Press.
Masters, I. G. and Evans, K. E., (1996), "Models for the Elastic Deformation of Honeycombs," Composite Structures, vol. 35, No. pp. 403-422.
Bezazi, A., Scarpa, F., and Remillat, C., (2005), "A Novel Centresymmetric Honeycomb Composite Structure," Composite Structures, vol. 71, No. 536-64.

(Continued)

*Primary Examiner* — David Sample
*Assistant Examiner* — Nicholas W Jordan
(74) *Attorney, Agent, or Firm* — John Steckler Schwab (57) ABSTRACT

A shear layer for a shear band that is used in a tire is provided that has multiple cells having a chiral configuration. The chiral configuration may be hexagonal or tetrachiral or have other configurations.

14 Claims, 8 Drawing Sheets

(56) References Cited

OTHER PUBLICATIONS

Balawi, S. and Abot, J. L., (2008), "A Refined Model for the Effective in-Plane Elastic Moduli of Hexagonal Honeycombs," Composite Structures, vol. 84, No. pp. 147-158.

Gonella, S. and Ruzzene, M., (2008), "Homogenization and Equivalent in-Plane Properties of Two Dimensional Periodic Lattices," International Journal of Solid and Structures, vol. 45, No. pp. 2897-2915.

Wang, A. J. and Mcdowell, D. L., (2004), "In-Plane Stiffness and Yield Strength of Periodic Metal Honeycombs," Transactions of the ASME Journal of Engineering Materials and Technology, vol. 126, No. pp. 137-156.

Chung, J. and Wass, A. M., (1999), "Compressive Response and Failure of Circular Cell Polycarbonate Honeycombs under in-Plane Uniaxial Stresses," Transactions of the ASME Journal of Engineering Materials and Technology, vol. 121, No. pp. 494-502.

Papka, S. and Kyriakides, S., (1998), "In-Plane Crushing of a Polycarbonate Honeycomb," International Journal of Solid and Structures, vol. 35, No. pp. 239-267.

Scarpa, F., Blain, S., Perrott, D., Ruzzene, M., and Yates, J. R., (2007), "Elastic Buckling of Hexagonal Chiral Cell Honeycombs," Composites Part A, vol. 38, No. pp. 280-289.

Torquato, S., Gibiansky, L. V., Silva, M. J., and Gibson, L. J., (1998), "Effective Mechanical and Transport Properties of Cellular Solids," International Journal of Mechanical Science, vol. 40, No. 1, pp. 71-82.

Lin, W., (1996), "The Point Force Response of Sandwich Panels and Its Application to Impact Problems," in 37th Structures, Structural Dynamics, and Materials Conference, AIAA/ASME/ASCE/AHS/ASC, Salt Lake City, UT April.

Becker, W., (2000), "Closed-Form Analysis of the Thickness Effect of Regular Honeycomb Core Material," Composite Structures, vol. 48, No. pp. 67-70.

Kapania, R. K., Soliman, H. E., Vasudeva, S., Hughes, O., and Makjecha, D. P., (2008), "Static Analysis of Sandwich Panels with Square Honeycomb Core," AIAA Journal vol. 46, No. 3, pp. 627-634.

Abdelal, G. F. and Atef, A., (2008), "Thermal Fatigue Analysis of Solar Panel Structure for Micro-Satellite Applications," International Journal of Mechanics and Materials in Design, vol. 4, No. pp. 53-62.

Khire, R. A., Dessel, S. V., Messac, A., and Mullur, A. A., (2006), "Study of a Honeycomb-Type Rigidified Inflatable Structure for Housing," Journal of Structural Engineering, vol. 132, No. 10, pp. 1664-1672.

Olympio, K. R. and Gandhi, F., (2007), "Zero-Nu Cellular Honeycomb Flexible Skins for One-Dimensional Wing Morphing," in 48th Structures, Structural Dynamics, and Materials Conference, AIAA/ASME/ASCE/AHS/ASC, Honolulu, Hawaii Apr. 23-26.

Bubert, E. A., Woods, B. K. S., Kothera, C. S., and Wereley, N. M., (2008), "Design and Fabrication of a Passive 1d Morphing Aircraft Skin," in 49th Structures, Structural Dynamics, and Materials Conference, AIAA/ASME/ASCE/AHS/ASC, Schaumburg, IL Apr. 7-10.

Seepersad, C. C., Allen, J. K., Mcdowell, D. L., and Mistree, F., (2008), "Multifunctional Topology Design of Cellular Material Structures," Journal of Mechanical Design, vol. 130, No. pp. 031404-031413.

Huang, J. S. and Gibson, L. J., (1999), "Microstructural Design of Cellular Materials—I: Honeycomb Beams and Plates," Acta Metallurgica et Materialia, vol. 43, No. pp. 1643-1650.

\* cited by examiner

CHIRAL HONEYCOMB MESO-STRUCTURES FOR SHEAR FLEXURE

PRIORITY CLAIM

This application claims the benefit of previously filed U.S. Provisional Patent Application entitled "Design of Chiral Honeycomb Meso-Structures for Shear Flexure", assigned U.S. Ser. No. 61/319,915, filed Apr. 1, 2010, and which is incorporated herein by reference in its entirety for all purposes.

BACKGROUND OF THE INVENTION

Chiral honeycomb meso-structures are auxetic cellular structures that exhibit negative Poison's ratio. Chiral honeycombs are structures arranged in an array of cylinders connected by ligaments. Four different configurations of these geometries with 4- and 6-ligaments attached are investigated for its use in a shear layer of tires including, but not limited to, non-pneumatic wheels. The objective of the invention is to find the ideal geometry for the shear layer of a shear band for a tire while meeting its requirements of shear properties. Finite Element based numerical test are carried out and optimum chiral meso-structures are found for the target shear properties.

The inventors are challenged with developing specialized materials that mimic elastomeric properties yet are composed of low dampening materials, thereby reducing energy loss under shear for use in the shear layer of a shear band of a tire. A solution may be found in a design of honeycombs. Our previous study on a design of shear flexure with honeycombs shows that cellular solids having negative Poisson's ratio, called auxetic, have high shear flexibility [1].

The hexagonal honeycombs have been studied as a basic cellular structure. Since the pioneering work on the honeycomb mechanics by Gibson and Ashby [2], many analytical and numerical models to describe in-plane effective properties of honeycombs are available in the literature; for example, a refined cell wall's bending model by adding a beam's stretching and hinging motion [3], a model with the energy method [4], a refined model with round shape at cell edges [5], and a model using the homogenization method [6]. In-plane mechanical properties with different cell types— square, hexagonal, triangle, mixed squares and triangles, diamond—were investigated by Wang and McDowell [7]. Circular and chiral shapes of honeycombs have also been studied for a functional design [8-10]. A multifunctional approach requiring structural stability and fast heat transfer was investigated with honeycomb structures [11].

Compared to the fundamental studies on cellular solids, their practical applications have been limited to the development of stiff and ultra-light sandwich cores for aircraft and aerospace structures, which are related to the honeycombs' out of plane properties [12-16], and rigidified inflatable structure for housing [17]. Recently, honeycombs' in-plane flexibility began to be designed in aerospace morphing technology [18, 19]. However, only limited practical studies on design with honeycomb configurations are available; for example, Seepersad et al. carried out a multifunctional design—structural and thermal in the application of gas turbine engines [20]. Huang and Gibson studied on the design of honeycombs for beam and plate structures [21]. The in-plane flexible design of honeycombs should be intensively studied for more structural functional applications.

Cellular materials are being considered to replace conventional materials such as polyurethane due to their lower densities, higher efficiencies under cyclic loading conditions, and their ability to be designed with specific mechanical properties. To be successful, the cellular material must have effective shear properties equaling those of polyurethane while reducing the affects of hysteretic energy loss. The material needs to have an effective shear modulus of between 4 and 4.5 MPa and must be able to withstand shear strains up to 10% before yielding occurs in the material. Additionally, the material needs to have an overall height of 12.7 mm and a length of 250 mm.

This application introduces a new design for the shear layer that comprises a chiral honeycomb structure.

SUMMARY OF THE INVENTION

The present invention includes a shear layer for use in a shear band that has a chiral configuration.

In some embodiments, the chiral configuration is hexagonal with six ligaments extending from the radial portion of the structure. The units closest to the boundaries may or may not have ligaments connecting the unit to a boundary.

In other embodiments, the chiral configuration may be tetrachiral. In other cases, the chiral configuration may be anti-tetrachiral. In either case, at least one unit may have at least one ligament that is connected to a boundary.

The present invention also encompasses a tire that uses a shear layer that includes a honeycomb structure that has a chiral structure in any of the embodiments described above.

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE REPRESENTATIVE EMBODIMENTS

To meet the requirements of the application that has the target values of shear modulus and strain, Finite Element (FE) analysis was carried out for a set of samples in three different configurations. FE modeling was done using the commercial FE package ABAQUS software package (Version 6.8-1). Each of, the three different chiral honeycomb configurations is explained below.

Reference will now be made in detail to embodiments of the invention, one or more examples of which are illustrated in the Figures. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. It should be noted that for the purposes of discussion, only half of the exemplary tire embodiments may be depicted in one or more of the figures. Reference numbers are used in the Figures solely to aid the reader in identifying the various elements and are not intended to introduce any limiting distinctions among the embodiments. Common or similar numbering for one embodiment indicates a similar element in the other embodiments. One of ordinary skill in the art, using the teachings disclosed herein, will understand that the same or substantially similar features are repeated on both sides of the tire.

DETAILED DESCRIPTION

Introduction

Cellular materials, for the purposes of this application, are materials constructed from an array of two dimensional, regularly patterned structures called mesostructures. These structures form the body of the material and are bounded by upper and lower membranes. As a whole, these cellular materials act as a single homogeneous material possessing effective mechanical properties which differ from the properties of the constituent material. The effective properties are a result of the mechanics of the system of mesostructures within the material. The objective in cellular material design is to develop a material which has effective properties desired for a particular application.

Hexagonal Chiral Honeycomb

Figure 1:
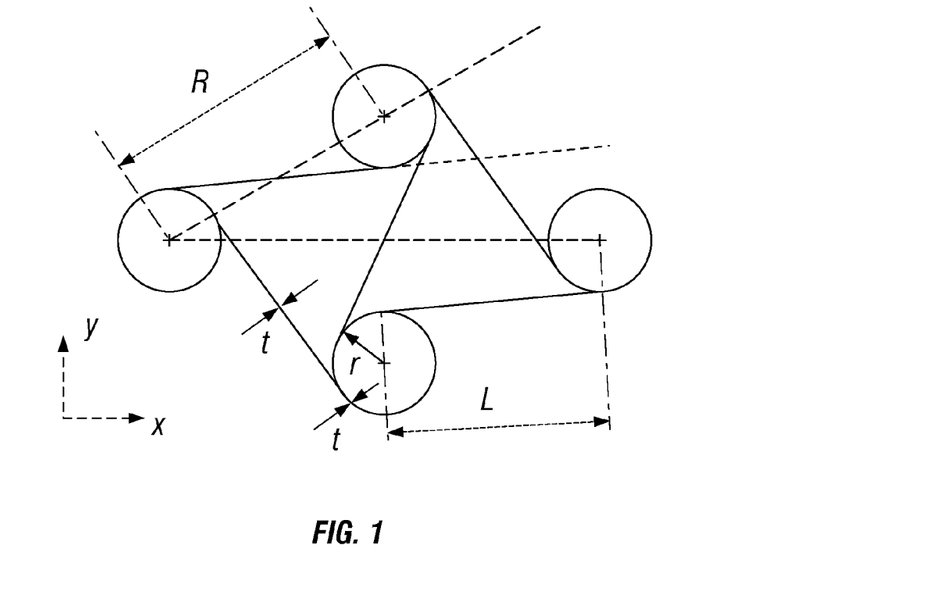
FIG. 1 shows the Unit cell configuration for a chiral honeycomb.

Initial studies are conducted on this model to check the suitability of the model to the specific application. This model has some design parameters that can be studied. In order to study the effect of each of the design parameter, a python script was developed within ABAQUS environment. The construction of unit cell configuration of the hexagonal chiral honeycomb is shown in FIG. 1. Each unit cell of the hexagonal chiral honeycomb has four cylinders with radius r, separated by a distance; R. Six ligaments of length, L are connected to each of the cylinders. The script was constructed based on these parameters and allows flexibility to switch the values of the design parameters r, L and the thickness of each member, t.

Figure 2:
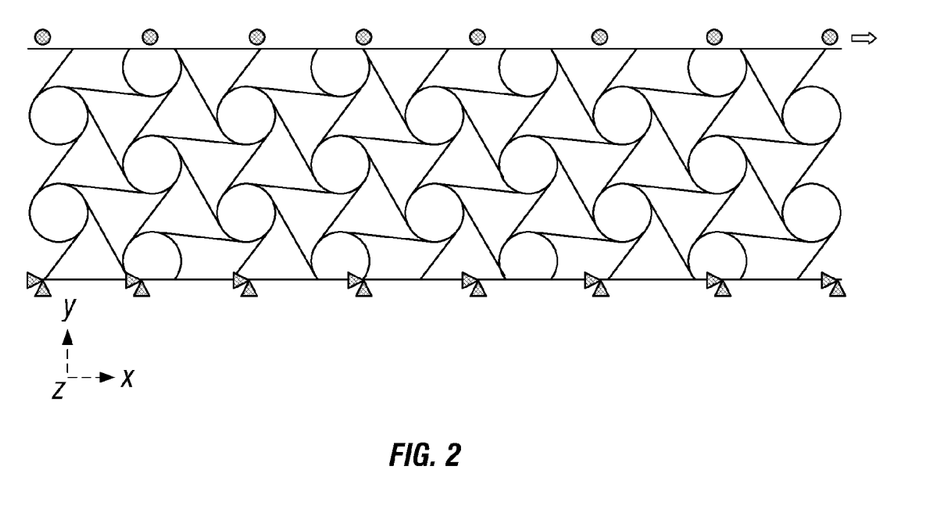
FIG. 2 shows a Hexagonal Chiral Honeycomb structure.

Analysis is done using B22 (3-node quadrilateral) elements to reduce computational effort while maintaining higher accuracy compared to linear elements. FIG. 2 shows the dimensions and geometry of the hexagonal chiral honeycomb configuration.

The height of the specimen is kept constant at 12.7 mm (0.5 in.) for all the geometries to meet the design requirements for the application. In-plane shear loading is applied to the specimen constraining the bottom plane completely. The boundary conditions given to the specimen are also described in the figure. The sample is sheared at 18% strain and the effective shear modulus and effective strain are calculated based on the following formula:

$$G^* = \frac{\tau}{\gamma^*}$$

Where $G^*$ is the effective shear modulus, $\tau$ is the maximum shear stress and $\gamma^*$ is the maximum shear strain of the sample. The maximum shear stress is calculated from the given formula:

$$\tau = \frac{\text{Total Reaction Force along shear direction}}{\text{Total Area}}.$$

The total area of the sample is the area on which the reaction force is acted upon. It is the total length of the sample times the thickness of the sample which is kept constant for all the samples at 19.5 mm for all the samples. The total reaction force is calculated as the sum of all the reaction forces acting on each of the top nodes. Maximum shear strain ($\gamma^*$) is calculated from the formula shown below:

$$\gamma^* = \frac{\text{Maximum Shear displacement}}{\text{Total height}}$$

The maximum shear displacement is the displacement of the sample along the shear plane when the Vonmises stress reaches the yield stress of the material used. The material used for this research is polycarbonate because of its ability to manufacture rapid prototyping samples that are used for testing. The material properties of polycarbonate that are obtained from the tensile test of a polycarbonate dog bone sample are given in Table 1. Series of tests were conducted for other honeycomb configurations using the same material properties that meet the target requirements.

TABLE 1

Material properties of polycarbonate used in the FEM model

| Young's modulus (GPa) | Poisson's ratio | Yield stress of the material (MPa) |
|---|---|---|
| 2.10 | 0.45 | 55 |

Tetra and Anti Tetra-Chiral Honeycomb

Figure 3:
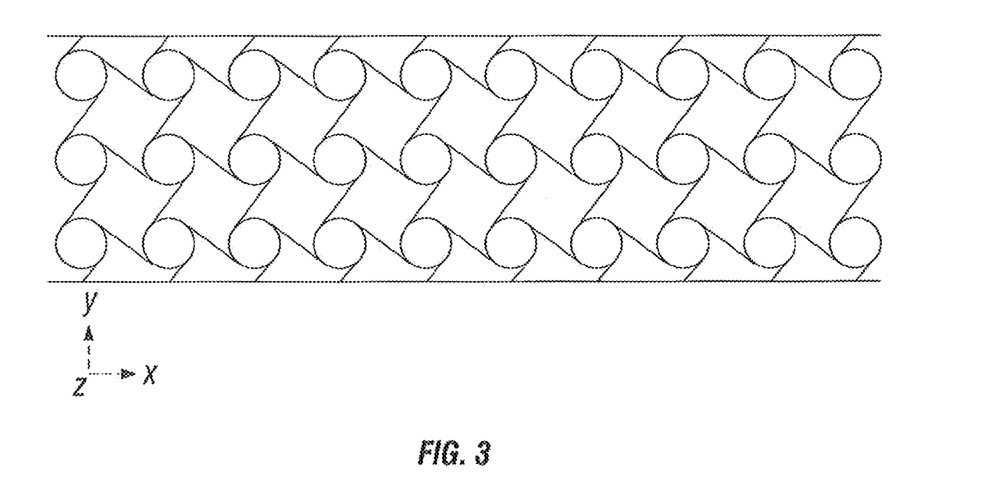
FIG. 3 illustrates a FEM model for a Tetrachiral Honeycomb structure.
Figure 4:
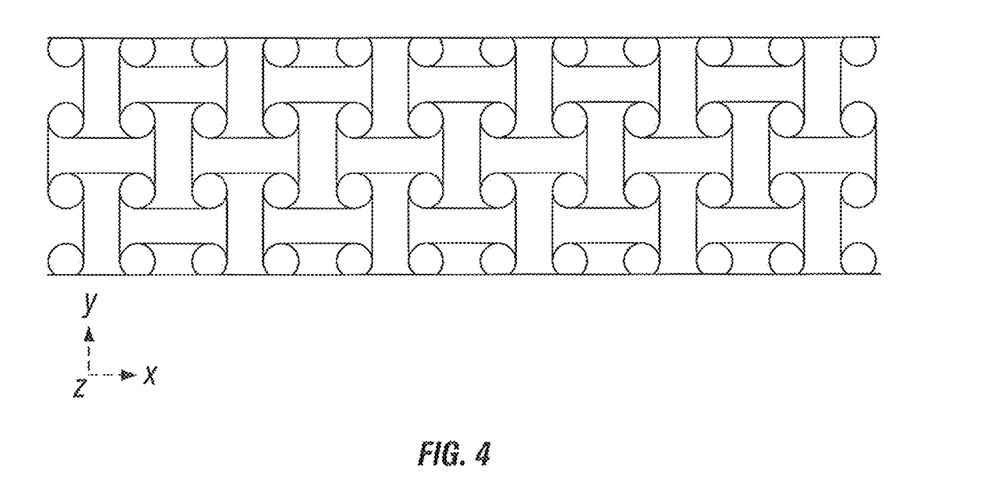
FIG. 4 depicts a FEM model for an Anti-tetrachiral Honeycomb structure.

Because of the directionality dependence of the structure for shear loading, tetragonal configuration is chosen for further studies. The construction of this geometry involves 4-ligaments connected to each of the cylindrical members of the structure. It can be constructed in two different configurations. If the ligaments are perpendicular to each other, this leads to the anti-tetrachiral honeycomb configuration. FIG. 3 and FIG. 4 shows the geometrical configurations for tatrachiral and anti-chiral geometries respectively. Both the configuration geometries have a height of 12.7 mm (0.5 in.). The dimensions of the geometries remain the same.

Hexagonal Chiral Honeycomb

Figure 5:
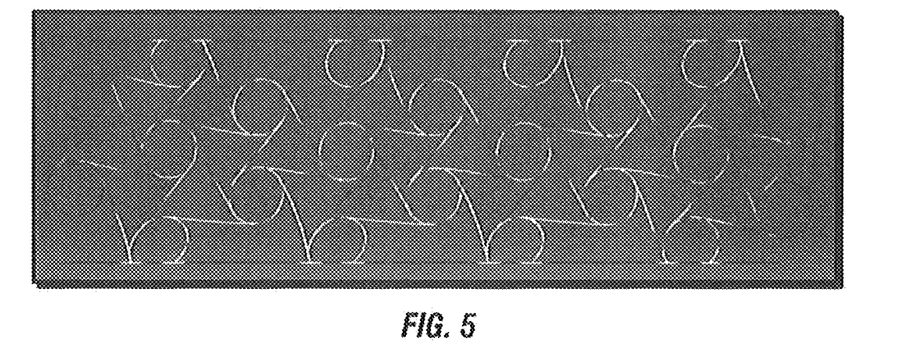
FIG. 5 shows a FEM model for a Chiral honeycomb configuration without ligaments connecting to the boundary walls.
Figure 6:
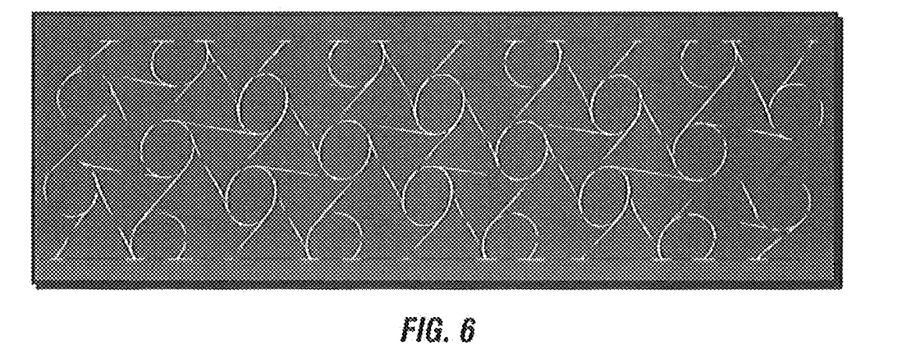
FIG. 6 shows a FEM model for a Chiral honeycomb configuration with ligaments connecting to the boundary walls.

The chiral honeycomb for the shear flexure sample is constructed in two different configurations. In the first configuration the connections of the ligaments with outer boundary wall are absent, where as in other configuration, the links are connected to the outer boundary walls. These two configuration geometries are shown in FIG. 5 and FIG. 6. The effective shear modulus, $G^*$ and shear strain, $\gamma^*$ are shown in Table 2. The value of radius of the cylindrical members is 1.5 mm.

TABLE 2

Effective shear modulus and shear strain for hexagonal chiral honeycomb

| | Effective Shear modulus. $G^*$ (MPa) | Effective maximum shear strain. $Y^*$ |
|---|---|---|
| Geometry without ligaments connected to boundary walls | 2.16 | 0.18 |
| Geometry with ligaments connected to boundary walls | 3.69 | 0.15 |

The configuration shown in FIG. 5 has lower values of shear modulus indicating the lack of strength of the geometry. FIGS. 4 and 5 also show the vonmises stress distribution when shear loading is applied. The honeycomb geometry without ligaments connected to boundaries has uneven stress distributions compared against its counterpart that has uniform stress distribution. So the final chosen configuration for the further studies have the ligaments connected to outer boundaries.

A Parametric study is conducted to find the influence of each of the parameters on the target values of shear modulus and strain. The thickness of each beam element is 0.7 mm. The effect on modulus with variation of each of the parameters is explained below.

Effect of Radius of Cylindrical Elements (r)

Figure 7:
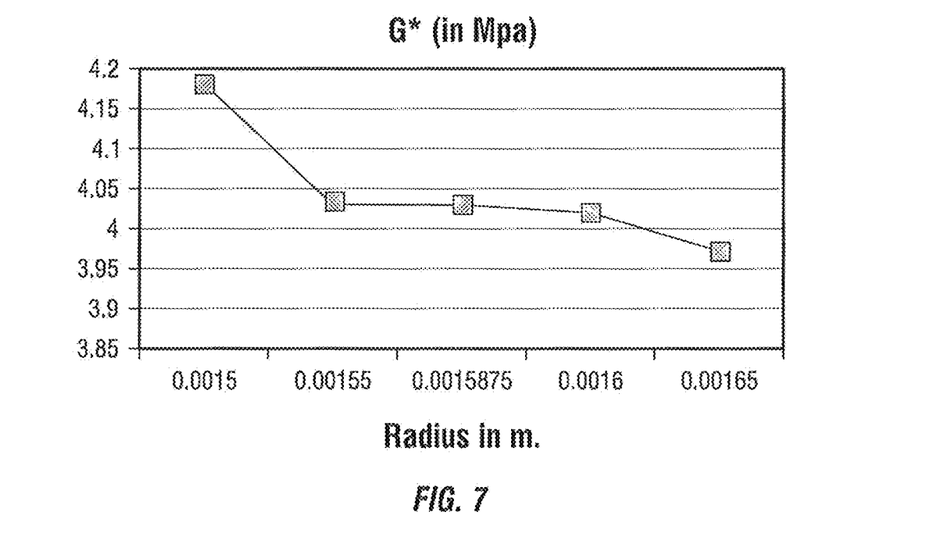
FIG. 7 is a graph showing the effect of the Radius of the cylindrical members of the honeycomb on the effective shear modulus exhibited by the honeycomb.
Figure 8:
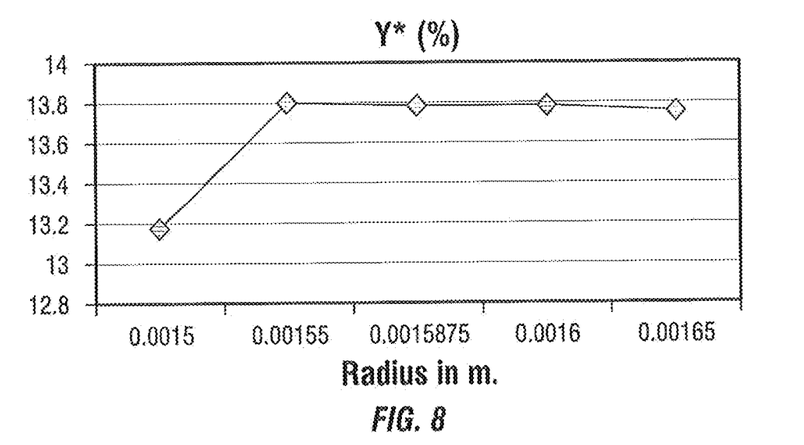
FIG. 8 is a graph showing the effect of the Radius of the cylindrical members of the honeycomb on the maximum effective shear strain exhibited by the honeycomb.

The cylindrical members play a significant role in the construction of this geometry. They strength of these members had a significant impact on the modulus of the geometry. The effect of radius of the cylindrical members on effective shear modulus and shear strain is shown in FIG. 7 and FIG. 8 respectively. The load on the shear plane is applied along the positive shear direction.

The results show that with increase in the radius of the cylindrical members, the effective modulus of the sample decreases. This can be attributed from the fact that the higher cylindrical members will make the ligaments shorter thus reducing the strength of the geometry. The maximum shear strain doesn't follow a pattern in particular, but the higher strain values were found at 1.5 mm. Lower values of r decreases the shear strain in the sample. Lower shear strain for higher stress values indicate that material deformation is lesser thus having higher stiffness. In order to find the behavior of this chiral honeycomb with the direction of shear, load is applied along negative direction.

Effect of Direction of Shear Loading

When a negative shear loading is applied for the parameters that are found to be optimum are used. The value of effective shear modulus is found to be 3.14 MPa and the shear strain is increased to 18% as against 13.8% for the positive shear loading. The deformation is more along the negative direction increasing the shear strain. The geometry has ligaments that are oriented along the positive x-direction.

Figure 9:
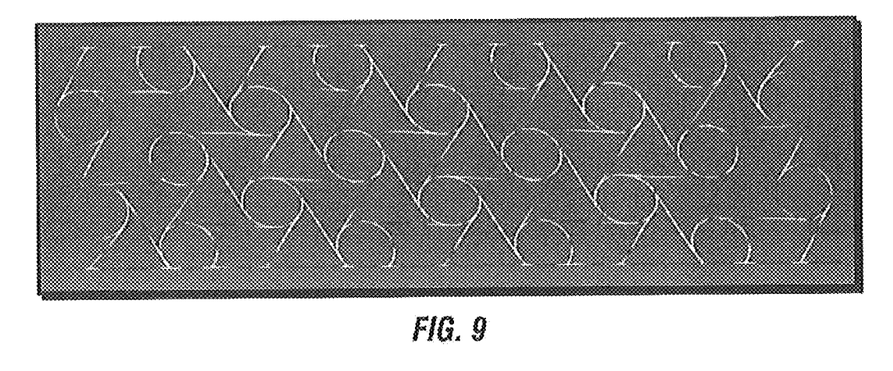
FIG. 9 shows the FEM Simulation result of a hexagonal chiral honeycomb subjected to negative shear loading.

FIG. 9 shows the vonmises stress distribution of the hexagonal chiral honeycomb. Some of the ligaments connecting the cylindrical elements are horizontal indicating a 30° bending. The initial configuration of the geometry is constructed in such a way that each ligament is connected to the other ligament through the cylinder at 60°. More shear strain indicates lesser shear modulus because of the decrease in stiffness of the material.

Effect of Cell Wall Thickness (t)

Figure 10:
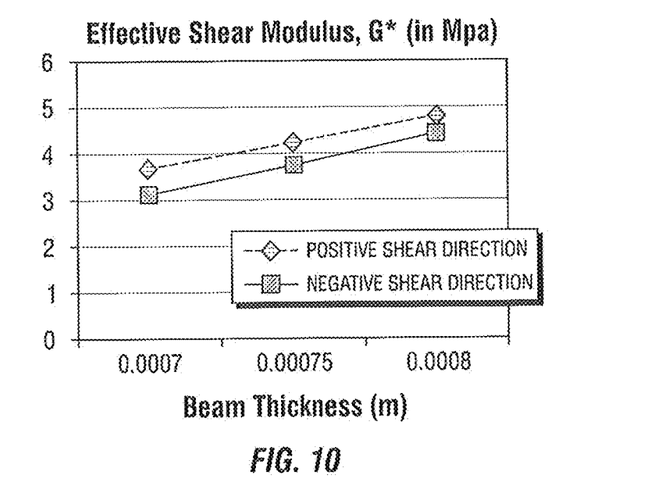
FIG. 10 shows the Effect of beam thickness on the maximum effective shear modulus.
Figure 11:
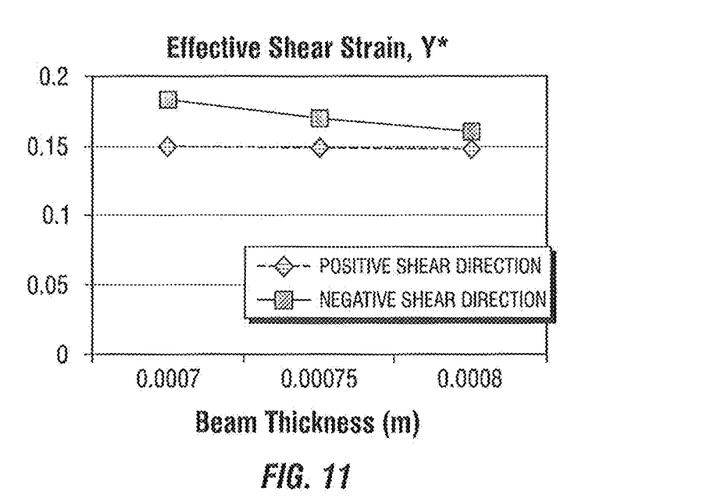
FIG. 11 is a graph illustrating the Effect of cell wall thickness on maximum effective shear strain.

In order to investigate the stiffness of the sample, cell wall thickness of the material is varied. Cell wall thickness is the thickness of each beam element in the model. Increase in cell wall thickness increases the strength of the material. Graphs showed in FIG. 10 and FIG. 11 shows the influence of cell wall thickness on the maximum effective shear modulus and strain. There is an increase in shear modulus with increase in cell wall thickness and thus decreasing shear strain which is expected. There is not much variation in shear strain values with increase in cell wall thickness while the shear loading is along positive shear direction. Increasing beam thickness to 0.9 mm could increase the modulus to 6.78 MPa and has reached the target shear modulus value.

Tetrachiral Honeycomb

Figure 12:
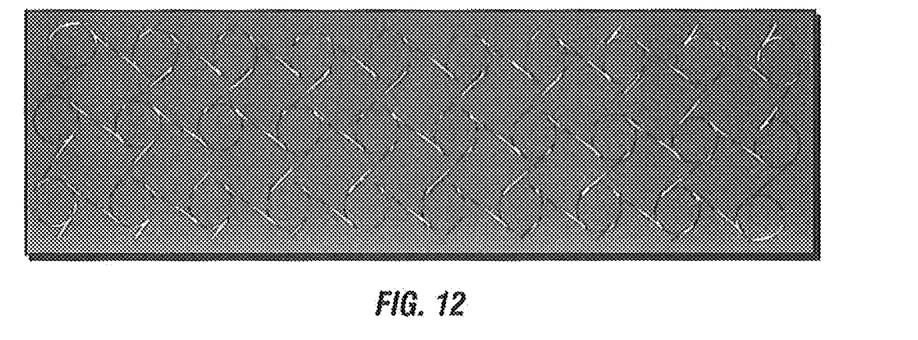
FIG. 12 shows the Vonmises Stress distribution under positive shear loading for a tetrachiral honeycomb.
Figure 13:
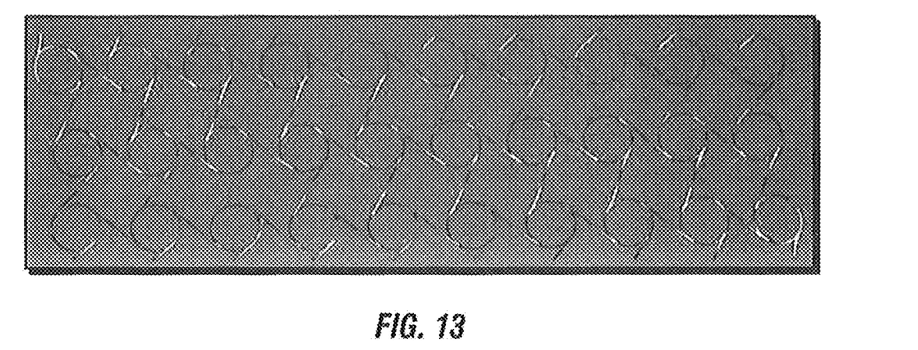
FIG. 13 shows the Vonmises Stress distribution under negative shear loading for a tetrachiral honeycomb.

Since the shear flexure needs to be directionally independent, other configurations available in chiral were explored. Tetrachiral geometry is created when each of the ligaments are perpendicular to one another. If they are connected to the circular cylinders along the opposite sides as shown in FIG. 3, it forms tetrachiral geometry. FE Analysis was performed for this configuration with same dimensions as that of the hexagonal chiral honeycomb. The cell wall thickness is maintained at 0.7 mm. Results shows a decrease in the values of effective shear modulus and shear strain and they were found to be as 3.01 MPa and 12.5% respectively for shear loading along positive shear direction. Shear modulus and strain are found to be as 2.97 MPa and 13.5% for shear loading along negative x-direction. FIG. 12 shows the vonmises stress distribution along the positive shear loading direction and FIG. 13 shows the vonmises stress distribution along negative shear direction. The stress distributions are even, but still the structure is directionally dependent which makes it difficult for the shear flexure. When the structure was subjected to negative shear loading, the deformation is more.

Anti-Tetrachiral Honeycomb

Figure 14:
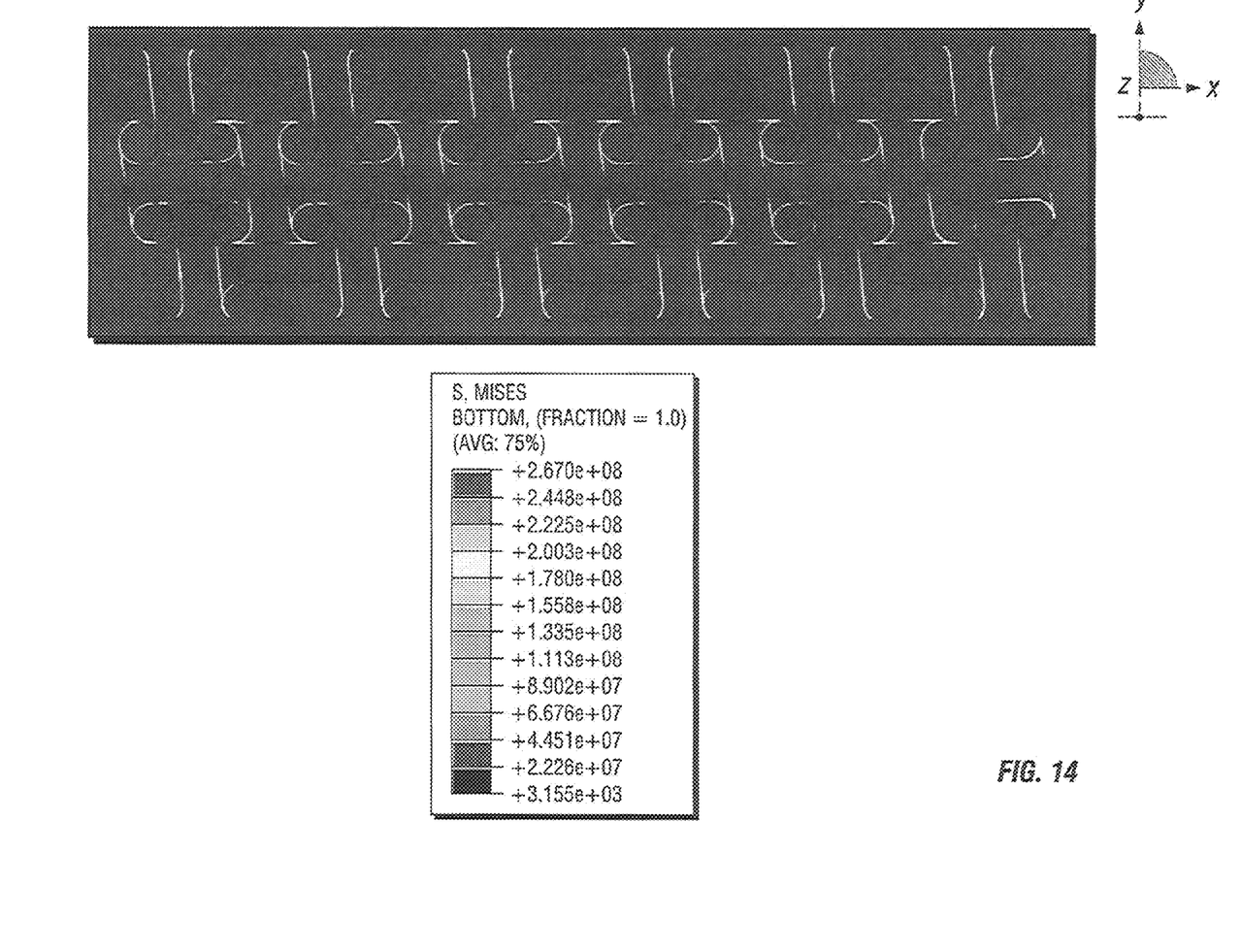
FIG. 14 is a graph showing the Vonmises Stress distribution under positive shear loading for an anti-tetrachiral honeycomb.
Figure 15:
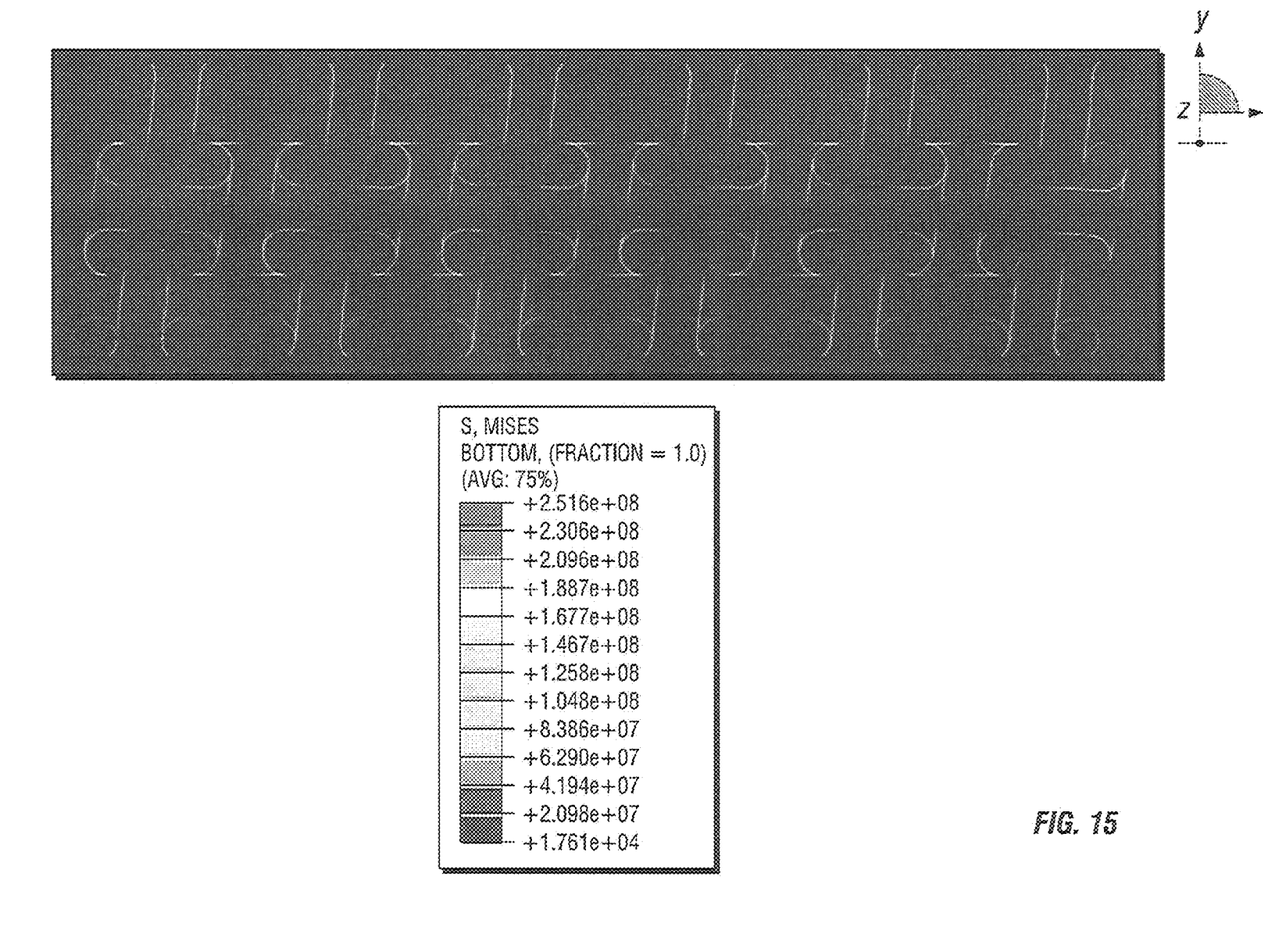
FIG. 15 is a graph depicting the Vonmises Stress distribution under negative shear loading for an anti-tetrachiral honeycomb.

When the ligaments are connected to the cylindrical elements on the same side, it creates an anti-chiral configuration. This configuration is found to be direction independent from the study. FIGS. 14 and 15 shows the vonmises stress distribution in the structure when the shear loading is along positive and negative x-directions respectively. The deformation pattern is observed to be symmetrical. Table 3 shows the values of effective shear modulus and shear strain for cell wall thickness of 0.7 mm.

TABLE 3

Effective shear modulus and shear strain for anti-tetrachiral honeycomb

|  | Effective Shear (modulus. G* MPa) | Effective maximum shear strain. Y* |
|---|---|---|
| Positive shear direction | 4.43 | 0.132 |
| Geometry with ligaments connected to boundary walls | 4.39 | 0.13 |

CONCLUSION

As can be seen, certain chiral honeycomb structures may exhibit suitable replacements for an elastomer as the primary material used in the shear layer of a shear band of a tire. These structures include but are not limited to anti-tetrachiral honeycombs.

INDUSTRIAL APPLICATIONS

As can be seen, the present invention provides a method for designing a suitable substitute for elastomeric materials such as rubber or polyurethane that are used in shear layer of a tire. Hence, a tire with lower mass, hysteresis and rolling resistance can be designed and manufactured quickly and effectively.

Figure 16:
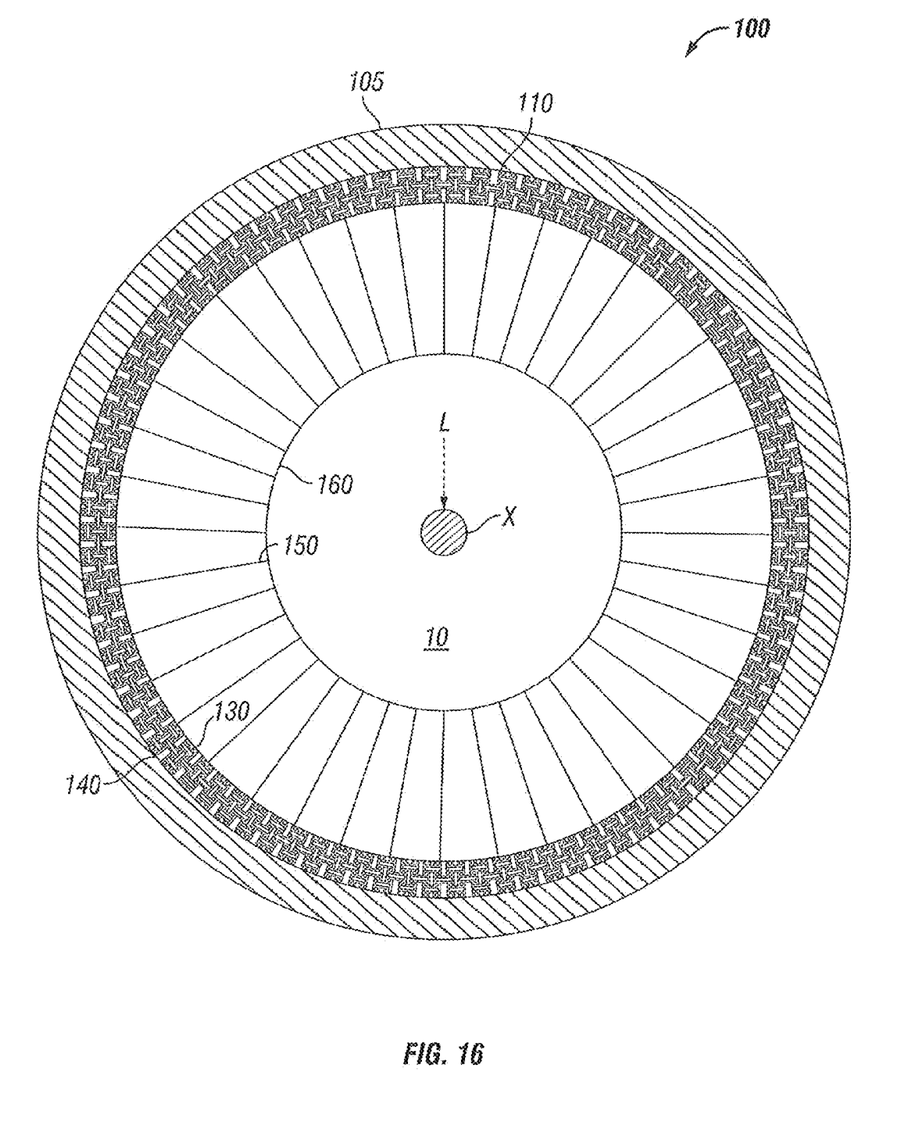
FIG. 16 is a front view of a tire that uses a Shear Layer having a Anti-chiral Honeycomb Configuration.

Looking at FIG. 16, a tire 100 having an axis of rotation, X, in accordance with the design disclosed by U.S. Pat. No. 7,201,194 is shown having a reinforced annular band 110 that has a shear layer with an anti-tetrachiral honeycomb design. On either side of the shear layer 110 are found inextensible membranes 130, 140. The reinforced annular band 110 is connected to the mounting band 160 by flexible spokes 160. The mounting band 160 in turn connects the tire to a hub or wheel 10. Also, a tread 105 is connected to the outward radial portion of the annular band 110. When the tire is loaded with a force or load, L, the tread and annular band will flatten (not shown) to create a pressure distribution in the contact patch of the tire that is similar to that found in a pneumatic tire that lacks such a shear layer or annular band. While these embodiments are shown using spokes as disclosed by U.S. Pat. No. 7,201,194, it is equally contemplated that the honeycomb structures could be used in embodiments with solid sidewalls such as is disclosed by U.S. Pat. No. 6,769,465. Both shear layers can be designed using the method of the present invention.

It should be understood that the present invention includes various other modifications that can be made to the exemplary embodiments described herein that come within the scope of the appended claims and their equivalents. These and other embodiments of the present invention are with the spirit and scope of the claims which follow.

What is claimed is:

1. A tire comprising a shear band with a looped shear layer forming an annular shape, said shear layer comprising units having a chiral configuration.

2. The tire of claim 1 wherein the chiral configuration is hexagonal with six ligaments extending from a radial portion of the structure.

3. The tire of claim 2, wherein said looped shear layer is bound on a first side by a first membrane and bound on a second side by a second membrane, wherein a plurality of units closest to said first membrane have at least one ligament connecting to said first membrane and a plurality of units closest to said second membrane have at least one ligament connecting to said second membrane.

4. The tire of claim 1, wherein the chiral configuration is tetrachiral.

5. The tire of claim 4, wherein at least one unit has at least one ligament that is connected to a boundary.

6. The tire of claim 1, wherein the chiral configuration is anti-tetrachiral.

7. The tire of claim 6, wherein at least one unit has at least one ligament that is connected to a boundary.

8. An apparatus comprising a tire that includes a shear band with a shear layer, said shear layer comprising units having a chiral configuration.

9. The apparatus of claim 8 wherein the chiral configuration is hexagonal with six ligaments extending from a radial portion of the structure.

10. The apparatus of claim 9, wherein said shear layer is bound on a first side by a first membrane and bound on a second side by a second membrane, wherein a plurality of units closest to said first membrane have at least one ligament connecting to said first membrane and a plurality of units closest to said second membrane have at least one ligament connecting to said second membrane.

11. The apparatus of claim 8, wherein the chiral configuration is tetrachiral.

12. The apparatus of claim 11, wherein at least one unit has at least one ligament that is connected to a boundary.

13. The apparatus of claim 8, wherein the chiral configuration is anti-tetrachiral.

14. The apparatus of claim 13, wherein at least one unit has at least one ligament that is connected to a boundary.

* * * * *